(12) United States Patent
Farr et al.

(10) Patent No.: US 7,914,601 B2
(45) Date of Patent: Mar. 29, 2011

(54) COLD START-UP METHOD FOR A DIRECT SMELTING PROCESS

(75) Inventors: Iain William Farr, Churchlands (AU); Rodney James Dry, City Beach (AU)

(73) Assignee: Technological Resources Pty. Limited, Melbourne (AU)

( * ) Notice: Subject to any disclaimer, the term of this patent is extended or adjusted under 35 U.S.C. 154(b) by 227 days.

(21) Appl. No.: 11/914,076

(22) PCT Filed: May 12, 2006

(86) PCT No.: PCT/AU2006/000624
§ 371 (c)(1),
(2), (4) Date: Aug. 26, 2008

(87) PCT Pub. No.: WO2006/119575
PCT Pub. Date: Nov. 16, 2006

(65) Prior Publication Data
US 2009/0031858 A1 Feb. 5, 2009

(30) Foreign Application Priority Data
May 13, 2005 (AU) .............................. 2005902461

(51) Int. Cl.
*C21C 7/072* (2006.01)
*C21C 7/076* (2006.01)

(52) U.S. Cl. ................. 75/503; 75/531; 75/532; 75/548
(58) Field of Classification Search ................... 75/503, 75/531, 532, 548
See application file for complete search history.

(56) References Cited

U.S. PATENT DOCUMENTS

| 2,526,658 | A | * | 10/1950 | Harman et al. | ................. 75/433 |
| 3,663,202 | A | * | 5/1972 | Ruter et al. | ..................... 75/475 |
| 5,066,326 | A | | 11/1991 | Agarwal et al. | |
| 5,286,277 | A | | 2/1994 | Aizatulov et al. | |
| 6,602,321 | B2 | * | 8/2003 | Dry et al. | ........................ 75/538 |
| 6,780,351 | B2 | * | 8/2004 | Wirth, Jr. | ........................ 264/30 |

\* cited by examiner

*Primary Examiner* — George Wyszomierski
*Assistant Examiner* — Tima M McGuthry-Banks
(74) *Attorney, Agent, or Firm* — Finnegan, Henderson, Farabow, Garrett and Dunner, L.L.P.

(57) ABSTRACT

A method of cold starting a molten bath-based direct smelting process for producing molten iron in a vessel (3) is disclosed. The method includes a step of preheating the vessel before supplying solid feed materials into the vessel. The method also includes a subsequent step of supplying an oxygen-containing gas and solid feed materials including material for forming slag, iron-containing feed material, and carbonaceous material into the vessel and generating heat and forming a bath of molten material that includes molten iron and molten slag in the vessel. This step includes supplying feed materials to promote formation of molten slag over molten iron in an early stage of developing the molten bath.

42 Claims, 1 Drawing Sheet

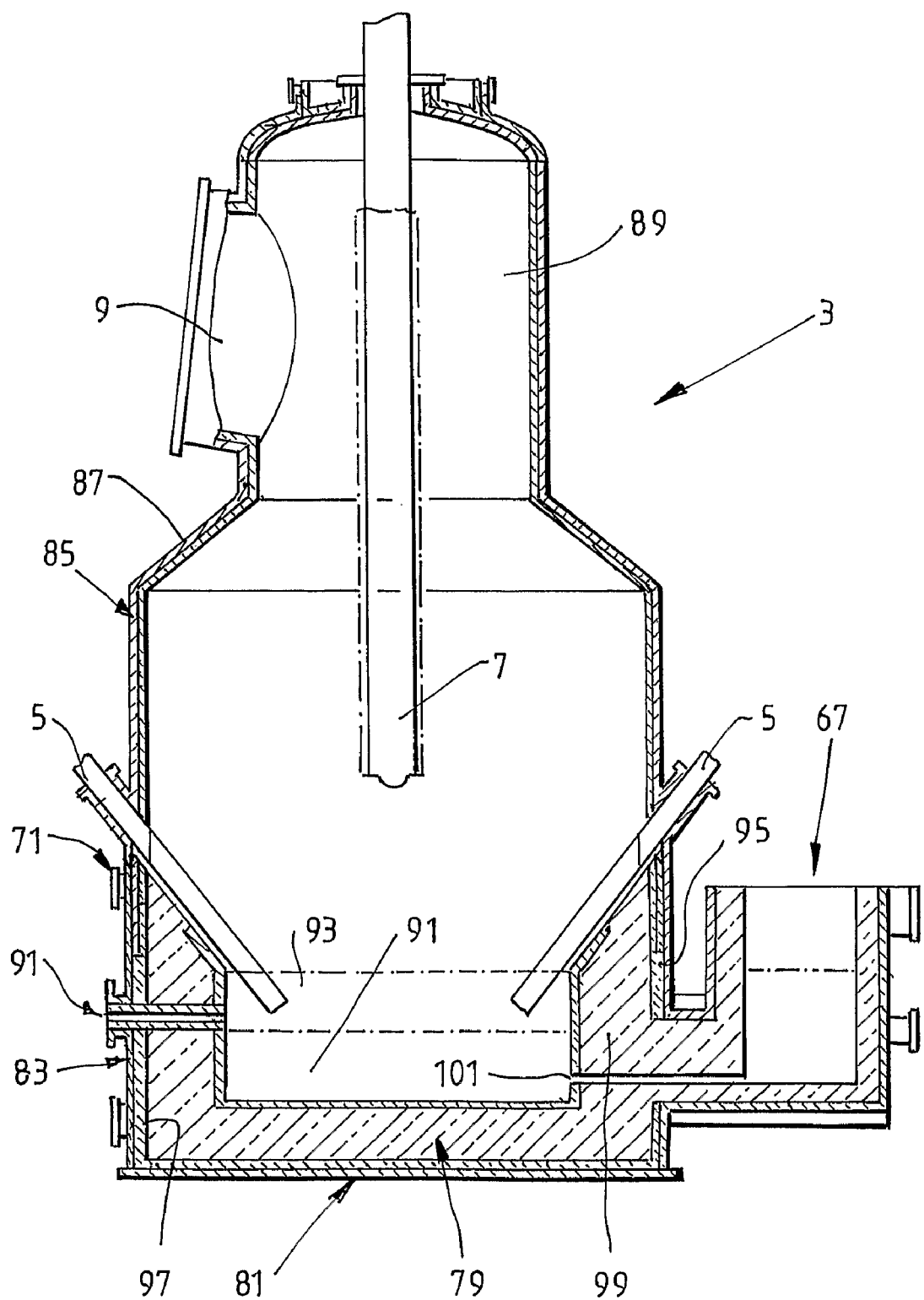

COLD START-UP METHOD FOR A DIRECT SMELTING PROCESS

The present invention relates to a method of cold starting molten bath-based direct smelting processes for producing molten iron in direct smelting vessels.

The term "cold starting" a direct smelting process in a direct smelting vessel is understood herein to mean starting up the process in the vessel without relying on molten metal and/or molten slag produced externally of the vessel to charge the vessel to establish an initial bath of molten material in the vessel.

The term "cold starting" as used herein covers situations in which there is an amount of solidified metal and/or slag in the vessel from the end of a previous direct smelting campaign in the vessel as well as situations in which there is no residual metal and/or slag in the vessel.

In particular, the present invention relates to molten bath-based direct smelting processes for producing molten iron from iron-containing metalliferous feed materials, such as iron ores, partly reduced iron ores and iron-containing waste streams (for example, from steelmaking plants).

A known molten bath-based direct smelting process is generally referred to as the HIsmelt process. In the context of producing molten iron, in steady-state operation the HIsmelt process includes the steps of:

(a) injecting into a bath of molten iron and molten slag in a direct smelting vessel: (i) a metalliferous feed material, typically iron ore in the form of fines; and (ii) a solid carbonaceous material, typically coal, which acts as a reductant of the metalliferous feed material and a source of energy; and (b) smelting the metalliferous feed material to iron in the bath.

The term "smelting" is herein understood to mean thermal processing wherein chemical reactions that reduce metal oxides take place to produce molten metal.

In steady-state operation of the HIsmelt process metalliferous feed material and solid carbonaceous material are injected into the molten bath through a number of lances/tuyeres which are inclined to the vertical so as to extend downwardly and inwardly through the side wall of the direct smelting vessel and into a lower region of the vessel so as to deliver at least part of the solids material into the metal layer in the bottom of the vessel. To promote the post-combustion of reaction gases in an upper part of the vessel, a blast of hot oxygen-containing gas, typically air or oxygen-enriched air, is injected into an upper region of the vessel through a downwardly extending lance. Off-gases resulting from the post-combustion of reaction gases in the vessel are taken away from the upper part of the vessel through an off-gas duct. The vessel includes refractory-lined water-cooled panels in the side wall and the roof of the vessel, and water is circulated continuously through the panels in a continuous circuit.

Start-up of molten bath-based direct smelting processes, such as the HIsmelt process, is a critical step because of the potential for causing damage to the direct smelting vessel during the course of start-up.

There are a range of options for hot and cold start-ups of molten bath-based direct smelting processes.

Hot start-up options include supplying a required charge of molten metal to a direct smelting vessel at a required charge temperature and thereafter selectively supplying feed materials including carbonaceous material, oxygen-containing gas, fluxes, and metalliferous feed materials to the vessel and operating the vessel under start-up operating conditions until such time as the vessel reaches target steady-state operating conditions.

In general terms, hot start-ups of molten bath-based direct smelting processes are more straight-forward and can be completed in a significantly shorter time period than cold start-ups. However, hot start-ups require a separate source of molten metal and/or molten slag to supply to the vessel as an initial charge for the vessel. Such separate sources of molten metal and/or molten slag may not be a viable option on commercial grounds, particularly if there are no existing molten metal producing facilities nearby. Moreover, even when such separate sources of molten metal and/or molten slag are part of a plant, they may not always be available at a required start-up time.

Hence, there is a need for an effective, reliable and safe cold start-up method.

According to the present invention there is provided a method of cold starting a molten bath-based direct smelting process for producing molten iron in a direct smelting vessel that includes the steps of:

(a) preheating the vessel; and thereafter (b) supplying an oxygen-containing gas and solid feed materials including material for forming slag, iron-containing material, and carbonaceous material into the vessel and generating heat and forming a bath of molten material that includes molten iron and molten slag in the vessel, and the step including supplying feed materials to promote formation of molten slag over molten iron in an early stage of developing the molten bath.

The purpose of step (b) is to establish a bath of molten material that is sufficiently large and has required characteristics for steady-state operation of the direct smelting process with minimal damage to refractories in the vessel. The characteristics include, by way of example, the amount of molten iron, the amount of molten slag, bath temperature, FeO content in molten slag, and carbon content in molten metal in the bath.

Producing molten slag, particularly at an early stage in the step of forming molten material in the bath, is important because it helps to minimise reoxidation of the molten iron in the molten material being formed.

Preferably step (b) includes selecting the rates of supplying the oxygen-containing gas and solid feed materials into the vessel to form the bath of molten material so that it includes any one or more than one of the following characteristics:

(a) at least 3 wt. % C, more preferably at least 3.5 wt. % C, in molten iron in the bath;

(b) an average temperature in the bath of at least 1400° C. and no more than 1650° C., more preferably no more than 1600° C.;

(c) no more than 15 wt. % FeO in molten slag in the bath.

Step (b) may include supplying the solid feed materials simultaneously to the vessel.

Alternatively, step (b) may include supplying the solid feed materials in varying proportions into the vessel during different stages of the step.

By way of example, preferably step (b) includes a first stage of forming molten slag as a major part, i.e. at least 50% by weight, of the molten material in the bath by supplying comparatively large amounts of slag forming material and carbonaceous material into the vessel and supplying no or a comparatively small amount of iron-containing feed material into the vessel.

It is preferred particularly that the first stage of step (b) includes forming molten slag so that the molten material at least substantially, i.e. at least 80% by weight, comprises molten slag.

Preferably step (b) further includes a second stage of commencing forming molten iron in the molten material in the bath or increasing the amount of molten iron in the molten material by commencing supplying iron-containing material into the vessel or increasing the supply of iron-containing material into the vessel.

Preferably step (b) includes commencing the second stage when there is sufficient molten slag in the molten material in the bath so that the concentration of FeO in the molten slag is able to be maintained below 15% by weight, preferably below 10% by weight, and more preferably below 8% by weight, of the molten material when substantial amounts of iron-containing feed materials are fed into the bath and the molten iron inventory starts to build up in the molten material.

The applicant has found that FeO can cause undesirable refractory wear during start-up and that, consequently, it is important to control the concentration of FeO in the molten bath. Thus, the above-described slag forming stage and the subsequent iron forming stage are an effective option for achieving cold start-up with minimal refractory damage.

Preferably step (b) includes supplying solid feed materials into the vessel by injecting the feed materials through solids injection lances that extend into the vessel.

Preferably step (b) includes supplying solid feed materials into the vessel that form at least 80% by weight of the molten bath by injecting the feed materials through solids injection lances that extend into the vessel.

Each of the types of solid feed materials may be injected through separate solids injection lances.

Alternatively, two or more than two of the types of solid feed materials may be mixed together and thereafter injected through solids injection lances.

Preferably step (b) includes conveying solid feed materials through solids injection lances and thereby injecting solid feed materials into the vessel with a carrier gas.

The carrier gas may be any suitable carrier gas, which term includes mixtures of two or more than two gases.

For example, the carrier gas may be a non-oxidising gas such as nitrogen or argon.

The carrier gas may also be an oxygen-containing gas, subject to safety considerations involved in mixing and conveying coal, particularly fine coal, and oxygen.

The solid feed materials may be in any suitable solid form and size.

Preferably the slag forming material includes slag produced in a previous campaign for producing molten iron in a direct smelting process in the same or a different vessel.

Preferably the slag is in a crushed or granulated form.

Preferably the slag forming material includes a flux, such as limestone.

Another suitable slag forming material is slag produced in a steelmaking process, preferably in a crushed or granulated form.

Preferably the iron-containing material includes 100% ore fines, a mixture of ore and iron, or partially reduced iron ore, such as DRI.

Preferably the carbonaceous material includes coal and/or coke breeze.

Preferably step (b) includes supplying the oxygen-containing gas into the vessel by injecting the oxygen-containing gas through at least one gas injection lance extending into the vessel.

Preferably the oxygen-containing gas includes air or oxygen-enriched air.

The smelting vessel has an outer steel shell and includes a refractory-lined hearth for containing the molten bath.

Preferably the hearth includes a safety lining of refractory material inwardly of the shell and a working lining of refractory material inwardly of the safety lining.

Preferably the hearth includes a sacrificial lining of refractory material inwardly of the working lining.

The term "sacrificial lining of refractory material" is understood herein to mean that the lining is provided having regard to refractory wear that is expected to take place during the start-up method.

Preferably the vessel is a vertical vessel and includes a plurality of solids injection lances spaced circumferentially around the vessel and extending downwardly and inwardly into the vessel (preferably through a side wall of the vessel), at least one oxygen-containing injection lance extending downwardly into the vessel (preferably through a roof of the vessel), an off-gas duct for discharging off-gas from the vessel, a means for tapping molten iron from the vessel (preferably a forehearth), and a means for tapping molten slag from the vessel.

With such a vessel, in a situation in which the method includes injecting solid feed materials through solids injection lances with a non-oxidising carrier gas, such as nitrogen, the method may also include injecting oxygen-containing gas through one or more than one other of the solids injection lances.

The purpose of the preheating step (a) is to heat the vessel, particularly the hearth refractories to avoid subsequent thermal shock when heat and thereafter molten material are generated in step (b). It also allows maximum heat to be retained in the molten bath. This is particularly important during the early stages of forming the bath when the volume of molten material in the bath is small.

Preferably step (a) includes preheating the vessel until the temperature of an inwardly facing surface of the hearth refractories is at least 1300° C.

In practice, it is not possible to monitor the temperature of the inwardly facing surface of the hearth refractories. However, in any given hearth design, there is a predictable relationship between the temperature of the inwardly facing surface of the hearth refractories and the temperature of an outer, more easily monitored section of the hearth refractories. Thus, in practice it is preferable to monitor the temperature of an outer section of heath refractories that are more easily accessible for temperature measurement and to predict the temperature of the inwardly facing surface of the hearth refractories from these measurements.

With the above in mind, preferably step (a) includes preheating the vessel until the temperature of an outer section of the working lining of the hearth is at least 500° C.

Preferably step (a) includes preheating the vessel in a series of stages that progressively increase the temperature in the vessel.

Preferably step (a) includes a first stage of injecting hot air or oxygen-enriched air into the vessel, initially at a temperature of the order of 200° C. and thereafter increasing the temperature to a temperature of around 850° C., and preheating the vessel with the heat of the hot air or oxygen-enriched air.

Preferably step (a) includes a second stage of supplying a combustible gas, such as natural gas, to the vessel after the temperature of the injected hot air or oxygen-enriched air reaches the temperature of around 850° C. and continuing to heat the vessel using heat generated in the vessel by combustion of the natural gas.

Preferably step (b) continues until the operating conditions in the vessel reach steady-state operating conditions for the direct smelting process. Thereafter, the direct smelting process can continue to produce molten iron by (i) injecting solid feed materials into the molten bath, for example via the solids injection lances, so that the solid feed materials penetrate the bath of molten material and gas that evolves from reactions in the bath carries molten material upwardly into a top space of the vessel and (ii) injecting oxygen-containing gas into the vessel via the one or more than one oxygen-containing injection lance and combusting combustible gas in the top space, with heat transfer to molten material and subsequent heat transfer to the bath when molten material returns to the bath that maintains the temperature in the bath.

According to the present invention there is also provided a molten bath-based direct smelting process for producing molten iron in a direct smelting vessel that includes the above-described method of cold starting the direct smelting process in the vessel and thereafter operating the process under steady-state conditions in the vessel and producing molten iron.

The present invention is described in more detail hereinafter with reference to the accompanying FIGURE which is a diagram that illustrates a direct smelting vessel for operating a direct smelting process and producing molten iron.

The vessel 3 is of the type described in detail in International applications PCT/AU2004/000472 and PCT/AU2004/000473 in the name of the applicant. The disclosure in the patent specifications lodged with these applications is incorporated herein by cross-reference.

With reference to the FIGURE, the vessel 3 has an outer steel shell 95, a refractory-lined hearth 79 for containing molten material, a side wall 85 which forms a generally cylindrical barrel extending upwardly from the sides of the hearth and includes an upper barrel section and a lower barrel section, a roof 87 that includes a central off-gas chamber 89, the side wall 85 and the roof 87 including water-cooled panels, an off-gas duct 9 extending from the off-gas chamber 89, a forehearth 67 for discharging molten iron continuously from the vessel 3, a slag notch 71 for discharging molten slag periodically from the vessel 3, and a slag drain tap hole 91 for discharging molten slag periodically from the vessel 3.

The hearth 79 includes that includes a base 81 and a side wall 83. The hearth 79 includes a safety lining 97 of refractory material, a working lining 99 of refractory material, and a sacrificial lining 101 of refractory material that forms an inwardly facing surface of the hearth.

With further reference to the FIGURE, the vessel 3 is fitted with:

(a) a downwardly extending water-cooled hot air blast ("HAB") lance 7 extending into a top space of the vessel 3, and (b) a plurality, typically eight, water-cooled solids injection lances 5 extending downwardly and inwardly through the side wall 85 and into the slag—only two of which are shown in the FIGURE.

With further reference to the FIGURE, the vessel contains a molten bath that includes molten iron and molten slag.

In the FIGURE the molten bath is shown under quiescent conditions, i.e. while a direct smelting process is not operating in the vessel 3. Under these conditions, the molten bath includes a molten iron layer 91 and a molten slag layer 93 on top of the iron layer. The molten bath shown in the FIGURE is at a height required to operate a direct smelting process under steady state conditions in the vessel 3, with molten iron in the forehearth 67.

In use, under steady-state process conditions, iron-containing material (such as iron ore fines, iron-bearing steel plant wastes or DRI fines), coal and flux (lime and/or dolomite) are directly injected into the bath via the solids injection lances 5.

Specifically, one set of lances 5 is used for injecting iron-containing material and flux and another set of lances 5 is used for injecting coal and flux.

The lances 5 are water-cooled to protect them from the high temperatures inside the vessel 3. The lances 5 are typically lined with a high wear resistant material in order to protect them from abrasion by the gas/solids mixture being injected at high velocity. The lances 5 are fixed in the vessel 3 while a direct smelting process is operating in the vessel 3.

The iron-containing material is pretreated before being supplied to the vessel 3 by being preheated to a temperature in the range of 600-700° C. and partially prereduced, typically to $Fe_3O_4$ in a fluidised bed preheater (not shown).

The injected coal de-volatilises in the bath, thereby liberating $H_2$ and CO. These gases act as reductants and sources of energy. The carbon in the coal is rapidly dissolved in the bath. The dissolved carbon and the solid carbon also act as reductants, producing CO as a product of reduction. The injected iron-containing feed material is smelted to molten iron in the bath and is discharged continuously via the forehearth 67. Molten slag produced in the process is discharged periodically via the slag notch 71. The injected materials generate substantial volumes of gases. These gases move upwardly through the molten bath and entrain molten material, thereby ensuring that the bath is thoroughly mixed, and carry molten material upwardly from the bath.

The process operates under pressure conditions, typically 0.8 bar gauge, in the vessel 3.

The typical reduction reactions involved in smelting injected iron-containing material to molten iron that occur in the bath are endothermic. The energy required to sustain the process and, more particularly these endothermic reactions, is provided by reacting CO and $H_2$ released from the bath with oxygen-enriched air injected at high temperatures, typically 1200° C., into the vessel 3 via the HAB lance 7. Typically, the HAB air is produced in stoves (not shown).

Energy released from the above-described post combustion reactions in the vessel top space is transferred to the molten iron bath via a "transition zone" in the form of highly turbulent regions above the bath that contain droplets of slag and iron. The droplets are heated in the transition zone by the heat generated from post combustion reactions and return to the slag/iron bath thereby transferring energy to the bath.

In one embodiment of the start-up method of the present invention, in order to start up the above-described HIsmelt direct smelting process in the vessel 3 it is necessary to:

(a) preheat the vessel 3 when it is empty or at least substantially empty (the vessel 3 may contain some residual solid iron and/or slag from a previous smelting campaign in the vessel 3) to a temperature of at least 1300° C. on the inwardly facing surface of the hearth refractories, and (b) supply coal, iron ore, slag, and air to the vessel 3 and generate sufficient heat and melt the solid feed materials and form a molten bath of a sufficient size and having required characteristics, such as temperature, FeO content in molten slag in the bath, and carbon content in molten metal in the bath.

Steps (a) and (b) are carried out with the connection between the vessel 3 and the forehearth 67 closed by a suitable plug (not shown).

The preheat step (a) includes the following steps:

Supplying cooling water to the water cooled panels of the side wall 85 and the roof 87 of the vessel 3 and to the HAB lance 7 and to the solids injection lances 5.

Supplying air at a relatively low temperature, typically starting at around 200° C., to the HAB lance 7 and gradually heating the refractories in the vessel 3 and allowing time for thermal expansion, as well as minimising thermal shock to the refractories. Initially, the air is non-HAB air only, typically around or lower than 200°

C. Subsequently, the air is a mixture of (a) HAB air (i.e hot air from stoves) at a temperature of 1200° C. and (b) non-HAB air.

Reducing the amount of non-HAB air in the mixture and thereby increasing the temperature of the air supplied to the vessel 3 via the HAB lance 7 continuously or via a series of steps to an injected air temperature of around 850° C. to raise temperature of the vessel 3, including the hearth 79, in a staged manner and drive off moisture.

Commencing supplying natural gas to the vessel 3 and combusting the natural gas in the HAB air supplied via the HAB lance 7 and thereby further increasing the temperature of the vessel 3, including the hearth.

Increasing the supply of natural gas and further increasing the temperature of the vessel 3, including the hearth 79, so as to bring the vessel 3, including the hearth 79, up to an operating temperature of at least 1300° C. on the inwardly facing surface of the hearth refractories.

Maintaining the supply of natural gas and HAB air and thereby allowing the vessel 3, including the hearth 79, to soak. Soaking under these conditions helps minimise heat loss from the molten material into the vessel refractories when the molten material is produced in the vessel 3. Such heat loss is a concern because of a risk of cooling the molten material and thereby freezing material in the vessel 3.

Step (b) of supplying coal, ore, slag, and air to the vessel and generating sufficient heat and melting the solid feed materials and forming a molten bath includes the following steps:

Injecting selected flow rates of each of slag, coal and iron ore with a carrier gas, such as $N_2$, through separate solids injection lances 5. Only a selected number rather than all of the lances 5 may be needed to supply raw materials to the vessel 3 during the formation of the molten bath.

Injecting selected flow rates of HAB air through the HAB lance 7.

Injecting, within a range of selected flow rates, oxygen-containing gas, such as $O_2$ or air, through at least one of the solids injection lances 5. The oxygen-containing gas may be used as a carrier gas in the lances 5 that are used for solids injection. Alternatively, the oxygen-containing gas may be injected through the lances 5 that are not being used for solids injection. This air combusts CO and $H_2$ liberated from the bath and provides a source of heat in close proximity to the bath that at least partially compensates for the cooling effect of the $N_2$ carrier gas of the raw materials.

Monitoring the conditions in the vessel 3, including temperature, and adjusting flow rates of feed materials as required and progressively generating heat and melting solid feed materials and increasing the amount of the molten bath being formed and the characteristics of the bath.

Injecting flux, as required, to control slag composition.

Step (b) includes selecting the flow rates of the solid feed materials injected into the vessel 3 so that molten slag is the only constituent or at least the major constituent of the molten bath that forms initially in the vessel 3 in a first slag forming stage of the step and thereafter changing the flow rates of injected solids to include increasing amounts of iron ore and thereby commence forming molten iron in the bath in a second iron forming stage in the step.

The purpose of forming molten slag first is to ensure that the concentration of FeO in the slag is kept below 15% by weight during subsequent build-up of the metal inventory in the molten bath when ore injection commences and molten iron forms in the bath in the second stage of step (b). This is beneficial to minimise erosion of refractories that is caused by high FeO concentrations.

In order to preserve the hearth refractories during step (b), the hearth includes the above-mentioned sacrificial lining 101 of refractory material, such as alumina-based refractories, to resist erosion caused by slag.

Step (b) includes monitoring conditions in the vessel 3 during the slag forming stage of step (b) by periodically opening the slag notch 71 in the vessel 3 to monitor the slag level in the vessel 3.

Step (b) includes switching from the slag forming stage to the iron forming stage and thereby commencing injection of iron ore when the molten bath, i.e. the molten slag, reaches the level of the slag notch 71.

Once supply of iron ore is established, the start-up method includes periodically opening the slag drain tap hole 101 and testing whether the molten iron level has reached the slag drain tap hole 101 (ie. upon opening of the slag drain tap hole 101, the flow of material will be substantially all molten iron). This indicates that the molten bath has reached a size ready for steady state operation of a direct smelting process in the vessel 3.

Prior to the iron level reaching the slag drain tap hole 101, the composition of slag flowing from the slag drain tap hole 101 may be monitored for composition, such as FeO levels, and the raw material feed mix may be adjusted accordingly, as required.

The above-described sequence of steps is an effective method of cold start-up of a HIsmelt process.

When the level of molten iron reaches the slag drain tap hole the plug is removed from the forehearth 67 and the direct smelting process commences operating under steady state process conditions. The process includes the steps of: (i) injecting solid feed materials into the molten bath via the solids injection lances so that the solid feed materials penetrate the bath and gas that evolves from reactions in the bath carries molten material upwardly into a top space of the vessel 3 and (ii) injecting HAB air into the vessel 3 via the HAB lance 7 and combusting combustible gas in the top space, with heat transfer to molten material and subsequent heat transfer to the bath when molten material returns to the bath that maintains the temperature in the bath.

Many modifications may be made to the embodiment of the method of the present invention described above without departing from the spirit and scope of the invention.

By way of example, whilst the embodiment includes injecting solid feed materials, namely slag, coal and iron ore with a $N_2$ carrier gas through separate solids injection lances 5 during start-up of the direct smelting process, the present invention is not so limited and is not confined to solids injection through the lances only. The present invention extends to embodiments in which at least a part of the solid feed materials, typically solids that make up to 20% by weight of the molten bath, is supplied to the vessel 3 by other options, such as gravity feed, during start-up of the direct smelting process.

By way of further example, the embodiment includes supplying iron ore to the vessel 3 during start-up. The present invention is not so limited. For example, in addition to iron ore, granulated iron may also be injected into the vessel. This may assist with increasing the rate at which a bath of molten iron of sufficient volume for steady state smelting operations is produced within the vessel.

The invention claimed is:

1. A method of cold starting a molten bath-based direct smelting process for producing molten iron having at least 3 wt % carbon in a direct smelting vessel without supply of molten material that includes the steps of:

(a) preheating the vessel; and thereafter (b) supplying an oxygen-containing gas and solid feed materials including material for forming slag, iron-containing feed material, and carbonaceous material into the vessel and generating heat through burning of carbonaceous material with oxygen containing gas and forming a bath of molten material that includes molten iron and molten slag in the vessel, the step (b) including:
supplying the solid feed materials to promote formation of molten slag over molten iron in an early stage of developing the molten bath, and
supplying the solid feed materials in varying proportions into the vessel during different stages of the step (b).

2. The method defined in claim 1 wherein step (b) includes selecting the rates of supplying the oxygen-containing gas and solid feed materials into the vessel to form the bath of molten material so that it includes any one or more than one of the following characteristics:

(a) at least 3.5 wt. % C, in molten iron in the bath;
(b) an average temperature in the bath of at least 1400° C. and no more than 1650° C.;
(c) no more than 15 wt. % FeO in molten slag in the bath.

3. The method defined in claim 1 wherein step (b) includes supplying the solid feed materials simultaneously to the vessel.

4. The method defined in claim 1 wherein step (b) includes a first stage of forming molten slag as a major part of the molten material in the bath by supplying comparatively large amounts of slag forming material and carbonaceous material into the vessel and supplying no or a comparatively small amount of iron-containing feed material into the vessel.

5. The method defined in claim 4 wherein the first stage of step (b) includes forming molten slag as at least 50% by weight of the molten material in the bath by supplying comparatively large amounts of the slag forming material and the carbonaceous material into the vessel and supplying no or a comparatively small amount of the iron-containing material into the vessel.

6. The method defined in claim 4 wherein the first stage of step (b) includes forming molten slag so that the molten material at least substantially comprises molten slag.

7. The method defined in claim 6 wherein the first stage of step (b) includes forming molten slag so that the molten material comprises at least 80% by weight molten slag.

8. The method defined in claim 4 wherein step (b) further includes a second stage of commencing forming molten iron in the molten material in the bath or increasing the amount of molten iron fl the molten material by commencing supplying iron-containing material into the vessel or increasing the supply of iron-containing material into the vessel.

9. The method defined in claim 8 wherein step (b) includes commencing the second stage when there is sufficient molten slag in the molten material in the bath so that the concentration of FeO in the molten slag is able to be maintained below 15% by weight of the molten material when substantial amounts of iron-containing feed materials are fed into the bath and the molten iron inventory starts to build up in the molten material.

10. The method defined in claim 8 wherein step (b) includes commencing the second stage when there is sufficient molten slag in the molten material in the bath so that the concentration of FeO in the molten slag is able to be maintained below 10% by weight of the molten material when substantial amounts of iron-containing feed materials are fed into the bath and the molten iron inventory starts to build up in the molten material.

11. The method defined in claim 8 wherein step (b) includes commencing the second stage when there is sufficient molten slag in the molten material in the bath so that the concentration of FeO in the molten slag is able to be maintained below 8% by weight of the molten material when substantial amounts of iron-containing feed materials are fed into the bath and the molten iron inventory starts to build up in the molten material.

12. The method defined in claim 1 wherein step (b) includes supplying solid feed materials into the vessel by injecting the feed materials through solids injection lances that extend into the vessel.

13. The method defined in claim 12 wherein step (b) includes injecting each of the types of solid feed materials through separate solids injection lances.

14. The method defined in claim 12 wherein step (b) includes mixing together two or more than two of the types of solid feed materials and thereafter injecting the mixed solid feed materials through solids injection lances.

15. The method defined in claim 12 wherein step (b) includes conveying solid feed materials through solids injection lances and thereby injecting solid feed materials into the vessel with a carrier gas.

16. The method defined in claim 15 wherein the carrier gas includes (a) a non-oxidising gas and (b) an oxygen-containing gas.

17. The method defined in claim 1 wherein step (b) includes supplying the oxygen-containing gas into the vessel by injecting the oxygen-containing gas through at least one gas injection lance extending into the vessel.

18. The method defined in claim 1 wherein the iron-containing material includes 100% ore fines, a mixture of ore and iron, or partially reduced iron ore.

19. The method defined in claim 1 wherein the vessel includes an outer steel shell and a refractory-lined hearth for containing the molten bath.

20. The method defined in claim 19 wherein the hearth includes a safety lining of refractory material inwardly of the shell, a working lining of refractory material inwardly of the safety lining, and a sacrificial lining of refractory material inwardly of the working lining.

21. The method defined in claim 19 wherein step (a) includes preheating the vessel until the temperature of an inwardly facing surface of the hearth refractories is at least 1300° C.

22. The method defined in claim 20 wherein step (a) includes preheating the vessel until the temperature of an outer section of the working lining of the hearth is at least 500° C.

23. The method defined in claim 1 wherein step (a) includes preheating the vessel in a series of stages that progressively increase the temperature in the vessel.

24. The method defined in claim 23 wherein step (a) includes a first stage of injecting hot air or oxygen-enriched air into the vessel, initially at a temperature of the order of 200° C. and increasing the temperature to a temperature of around 850° C., and preheating the vessel with the heat of the hot air or oxygen-enriched air.

25. The method defined in claim 24 wherein step (a) includes a second stage of supplying a combustible gas, such as natural gas, to the vessel after the temperature of the injected hot air or oxygen-enriched air reaches the temperature of around 850° C. and continuing to heat the vessel using heat generated in the vessel by combustion of the natural gas.

26. A molten bath-based direct smelting process that includes the method of cold starting the direct smelting process for producing molten iron in a direct smelting vessel defined in claim 1 and thereafter operating the process under steady-state conditions in the vessel and producing molten iron having at least 3 wt % carbon.

27. A method of cold starting a molten bath-based direct smelting process for producing molten iron having at least 3 wt % carbon in a direct smelting vessel without supply of molten material that includes the steps of:
(a) preheating the vessel; and thereafter
(b) supplying an oxygen-containing gas and solid feed materials including material for forming slag, iron-containing feed material, and carbonaceous material into the vessel and generating heat through burning of carbonaceous material with oxygen containing gas and forming a bath of molten material that includes molten iron and molten slag in the vessel, the step (b) including:
supplying the solid feed materials to promote formation of molten slag over molten iron in an early stage of developing the molten bath, and
supplying the solid feed materials into the vessel by injecting the feed materials through solids injection lances that extend into the vessel.

28. The method defined in claim 27 wherein step (b) includes injecting each of the types of solid feed materials through separate solids injection lances.

29. The method defined in claim 27 wherein step (b) includes mixing together two or more than two of the types of solid feed materials and thereafter injecting the mixed solid feed materials through solids injection lances.

30. The method defined in claim 27 wherein step (b) includes conveying solid feed materials through solids injection lances and thereby injecting solid feed materials into the vessel with a carrier gas.

31. The method defined in claim 30 wherein the carrier gas includes (a) a non-oxidising gas and (b) an oxygen-containing gas.

32. The method defined in claim 27 wherein step (b) includes supplying the oxygen-containing gas into the vessel by injecting the oxygen-containing gas through at least one gas injection lance extending into the vessel.

33. The method defined in claim 27 wherein the iron-containing material includes 100% ore fines, a mixture of ore and iron, or partially reduced iron ore.

34. The method defined in claim 27 wherein the vessel includes an outer steel shell and a refractory-lined hearth for containing the molten bath.

35. The method defined in claim 34 wherein step (a) includes preheating the vessel until the temperature of an inwardly facing surface of the hearth refractories is at least 1300° C.

36. A method of cold starting a molten bath-based direct smelting process for producing molten iron having at least 3 wt % carbon in a direct smelting vessel without supply of molten material that includes the steps of:
(a) preheating the vessel, the vessel including an outer steel shell and a refractory-lined hearth for containing a molten bath, the step (a) including preheating the vessel until the temperature of an inwardly facing surface of the hearth refractories is at least 1300° C.; and thereafter
(b) supplying an oxygen-containing gas and solid feed materials including material for forming slag, iron-containing feed material, and carbonaceous material into the vessel and generating heat through burning of carbonaceous material with oxygen containing gas and forming the molten bath of molten material that includes molten iron and molten slag in the vessel, the step (b) including supplying the solid feed materials to promote formation of molten slag over molten iron in an early stage of developing the molten bath.

37. The method defined in claim 36 wherein the hearth includes a safety lining of refractory material inwardly of the shell, a working lining of refractory material inwardly of the safety lining, and a sacrificial lining of refractory material inwardly of the working lining.

38. The method defined in claim 37 wherein step (a) includes preheating the vessel until the temperature of an outer section of the working lining of the hearth is at least 500° C.

39. The method defined in claim 36 wherein step (a) includes preheating the vessel in a series of stages that progressively increase the temperature in the vessel.

40. The method defined in claim 39 wherein step (a) includes a first stage of injecting hot air or oxygen-enriched air into the vessel, initially at a temperature of the order of 200° C. and increasing the temperature to a temperature of around 850° C., and preheating the vessel with the heat of the hot air or oxygen-enriched air.

41. The method defined in claim 40 wherein step (a) includes a second stage of supplying a combustible gas to the vessel after the temperature of the injected hot air or oxygen-enriched air reaches the temperature of around 850° C. and continuing to heat the vessel using heat generated in the vessel by combustion of the natural gas.

42. A molten bath-based direct smelting process that includes the method of cold starting the direct smelting process for producing molten iron in a direct smelting vessel defined in claim 36 and thereafter operating the process under steady-state conditions in the vessel and producing molten iron having at least 3 wt % carbon.

* * * * *